United States Patent [19]

Smith

[11] Patent Number: 5,466,007
[45] Date of Patent: Nov. 14, 1995

[54] VEHICLE SUSPENSION SYSTEM

[75] Inventor: Wilfred W. Smith, Coventry, Great Britain

[73] Assignee: Dunlop Limited, United Kingdom

[21] Appl. No.: 196,209

[22] PCT Filed: Sep. 14, 1992

[86] PCT No.: PCT/GB92/01687

§ 371 Date: Mar. 11, 1994

§ 102(e) Date: Mar. 11, 1994

[87] PCT Pub. No.: WO93/05970

PCT Pub. Date: Jan. 4, 1993

[30] Foreign Application Priority Data

Sep. 13, 1991 [GB] United Kingdom ............ 9119534

[51] Int. Cl.$^6$ .................................... B60G 17/015
[52] U.S. Cl. ............................ 280/840; 280/707
[58] Field of Search ................ 280/840, 6.1, 707

[56] References Cited

U.S. PATENT DOCUMENTS

| | | | |
|---|---|---|---|
| 3,624,456 | 11/1970 | Elliott | 361/196 |
| 4,401,310 | 8/1983 | Ishikawa et al. | 280/6.1 |
| 4,518,169 | 5/1985 | Kuroki et al. | 280/840 |
| 4,693,485 | 9/1987 | Kamei et al. | 280/6.1 |

FOREIGN PATENT DOCUMENTS

| | | |
|---|---|---|
| 0091017 | of 1983 | European Pat. Off. . |
| 3603346 | 8/1986 | Germany . |
| 4300316 | 8/1991 | Germany . |
| 4012078 | 10/1991 | Germany . |
| 57-95209 | 6/1982 | Japan . |
| 57-121911 | 7/1982 | Japan . |
| 1141112 | 6/1989 | Japan . |
| 2230358 | 10/1990 | United Kingdom . |

OTHER PUBLICATIONS

IEEE Transactions on Industrial Electronics, vol. 35, No. 2, May 1988, New York, N.Y., USA—pp. 193–200, Hirose et al. 'Toyota electronic modulated air suspension system for the 1986 Soarer' see p. 197.

Automobiltechnische Zeitschrift, vol. 88, No. 7/8, Aug. 1986, Stuttgart, BRD—pp. 407–413, Bantle und Bott 'Der Porsche Typ 959–Gruppe B—en besonderes Automobil—Teil 3', see p. 410, right col., paragraph 3 —p. 411, left col., paragraph 5.

*Primary Examiner*—Kenneth R. Rice
*Attorney, Agent, or Firm*—Stevens, Davis, Miller & Mosher

[57] ABSTRACT

A vehicle suspension system incorporating suspension units (46–48) associated with respective vehicle wheels and selectively controllable to vary the ride height of the vehicle. Vehicle speed sensors and height sensors are responsive to departure of the ride height from a predetermined height datum which is a function of the vehicle speed and to provide a signal related thereto to control movement of at least one suspension unit thereby to tend to move at least a part of the vehicle to said predetermined height datum. Timer means are provided so that the movement of a suspension unit in response to a signal from a height sensor is inhibited until a signal of at least a predetermined magnitude has persisted for at least a prescribed part of a prescribed period of time.

14 Claims, 7 Drawing Sheets

Fig. 1

1 — PLASTICS COVER
2 — EXCITING COIL
3 — PICK UP COIL
4 — PISTON ROD
5 — MAIN SHOCK ABSORBER BODY
6 — DUST COVER

Parameter definition

| | Value |
|---|---|
| maximum speed for transition from standard to high profile | 40 mph |
| speed (V1) above which the system must return to standard from high profile | 40 mph |
| speed below which the vehicle is determined to be stationary | 0.5 mph |
| speed above which the system can select low profile | 55 mph |
| speed (V2) below which the system must return to standard from low profile | 40 mph |
| levelling inhibit time from time of footbrake off | 1.5 sec |
| time for which (V1) must exist to enter standard height from high profile | 40 sec |
| maximum period of footbrake inhibit function | 80 sec |
| time for which (V2) must exist to enter low profile state | 40 sec |
| height deviation from standard for high profile | 45 mm |
| height deviation from standard for low profile | 30 mm |
| height deviation from standard for kneel position | 70 mm |

VEHICLE SUSPENSION SYSTEM

BACKGROUND OF THE INVENTION

This invention relates to a vehicle suspension and in particular, although not exclusively, to a suspension for an untracked wheeled vehicle. It relates also to a vehicle incorporating the suspension of the invention and to method of controlling a vehicle suspension.

The invention is directed particularly but not exclusively to a vehicle of a kind having an air or like gas suspension.

The invention seeks to provide a suspension which offers a facility to achieve good ride characteristics related to the operating condition of the vehicle.

SUMMARY OF THE INVENTION

In accordance with one of its aspects the present invention provides a vehicle suspension comprising in. combination vehicle speed sensing means, suspension units associated with respective vehicle wheels and selectively controllable to vary the ride height of the vehicle, each suspension unit incorporating an electrical height sensing device responsive to departure of the ride height from a predetermined height datum which is a function of the vehicle speed and to provide a signal related thereto to control movement of at least one suspension unit thereby to tend to move at least a part of the vehicle to said predetermined height datum and timer means whereby the movement of a suspension unit in response to a signal from a height sensing device is inhibited until a signal of at least a prescribed magnitude has persisted for at least a prescribed part of a prescribed period of time.

The suspension units each may be gas, e.g pneumatic suspension units and valve means responsive to signals from the height sensing device may be provided for selective control of gas to or from each suspension unit.

Each suspension unit may incorporate a damping device and the damping device may be of a kind which incorporates an electrical height sensing device to provide a signal related to departure of the ride height from a predetermined height datum. An example of a suitable damper unit is a linear variable differential transformer type unit such as described in the specification of UK Patent Application GB 2027207A. Alternatively electrical height sensing devices such as of the types comprising ultrasonic displacement sensors or potentiometers may be employed.

The invention further provides a variable sensitivity system in which the period for which the timer means inhibits movement of a suspension unit in response to a signal from a height sensor is a function of the magnitude of that signal. The sensitivity variation may be substantially continuously variable whereby for example the time delay is a function of an averaged value of the signal from the height sensor or it may be of a stepped kind in which when the magnitude of the signal exceeds a prescribed magnitude there is no time delay or only a short period of time delay whereas when the magnitude of the height departure signal is below a prescribed magnitude the timer means causes a delay of at least a prescribed magnitude.

It is envisaged that the system may have two sensitivity modes, which may be known as insensitive and sensitive modes respectively. The sensitive mode may be invoked for example during initial start up of the vehicle to result in speedy supply of gas to gas suspension units thereby to place the vehicle at approximately the desired ride height. That initial desired ride height may be a height lying within a prescribed band. After a prescribed period following initial start up the system may change to an insensitive mode of operation in which the ride height information is used to position the vehicle more accurately to a particular height. The later positioning may be achieved by the signals from the height sensors indicating departure from a prescribed desired height; if that signal persists continuously for at least a specified period of time or at least a specified proportion of a prescribed period of time, that signal may be regarded as indicative of a valid error situation and control means associated with the suspension system may operate to adjust the vehicle height by admitting or exhausting gas from one or more of the suspension units.

More particularly, the vehicle suspension may comprise an electronic control unit having an algorithm adapted to collate and store relevant input data as a vehicle traverses a road and to eliminate irrelevant input data thereby to ensure that the system does not respond inappropriately to transient inputs. In one example the algorithm may be adapted to decide which of the four height sensors has the largest error relative to a datum, to decide whether the error is above or below the datum and whether the error is outside pre-set limits. If the error is greater than the pre-set limits a timer may be initiated to set a first time delay T1. If the direction of error should change during the time T1, the timer may be adapted to be re-set. However, if the timer times out, i.e. there is no intermediate change of direction, then the electronic control unit may cause gas to be admitted or exhausted from one or more of the suspension units.

The magnitude of T1 may have two values dependent upon whether the system is to be operating in a sensitive or an insensitive mode. The selection of mode may be achieved automatically having regard to the vehicle speed and/or for example to the magnitude of height error from a prescribed datum. The system may be arranged to select the sensitive (i.e. rapid response) mode automatically when a change of ride height state of at least a certain magnitude has been demanded. The demand might arise automatically having regard to information from the height sensor means or as a result of a manual information input to the electronic control unit (e.g when changing from a manual height override situation to an automatic normal mode of operation). The insensitive mode may be invoked automatically by the vehicle attaining a height lying within a prescribed error band from the desired ride height. In that case the timer T1 has a value much greater than when in the sensitive mode. The purpose of this greater time is to ensure that the system does not respond inappropriately to transient road input data. Thus operation of control equipment to admit or exhaust gas from the suspension units is inhibited unless reasonably necessary, and energy to maintain a supply of compressed gas is conserved.

The vehicle suspension may have associated therewith an electronic control unit which operates automatically to control the suspension units in response to received information and which also operates in response to a manual override. The system may be adapted to facilitate manual override for example to put the suspension in a kneel condition in which the vehicle is lowered; the electronic control unit may be programmed to allow a kneel condition to be achieved only if the vehicle is stationary and/or the hand (park) brake is applied to resist vehicle movement.

The manual override may be operable to a high profile condition in which the ride height is selected by the driver to be greater than normally would prevail in automatic operation of the system, The electronic control unit may be arranged to allow entry to the high profile mode only if the vehicle speed is below a prescribed threshhold, e.g 35 miles per hour, and it may furthermore be arranged to revert automatically to a standard ride height mode in the event of the vehicle speed exceeding a prescribed figure, which may be aforementioned speed which must not be exceeded for entry into the high profile mode, or another datum speed.

The system may also incorporate a manual override which locks the suspension to a standard ride height in the case of a vehicle used for towing. Alternatively, sensor means may be provided automatically to detect when the vehicle is coupled to a load for towing and automatically to inhibit significant departures from a standard ride height, e.g to a high or low ride height at least at such times as the vehicle is in motion.

The electronic control unit may be adapted automatically to lower the ride height of the vehicle from a standard to a lower height when the vehicle speed exceeds a prescribed magnitude, e.g 60 miles per hour. The control unit may be adapted also to return to a normal ride height if the vehicle speed falls below a prescribed figure for at least a prescribed period and/or to revert forthwith to a normal, standard mode if there is a significant reduction of speed to below another prescribed speed.

BRIEF DESCRIPTION OF THE DRAWINGS

An example of an electronically controlled vehicle suspension system in accordance with the present invention will now be described with reference to.

An example of valve means for use in the present invention are described with reference to the accompanying diagrammatic drawings in which.

DETAILED DESCRIPTION OF THE PREFERRED EMBODIMENT

The following table lists major components of the system.

The electronically controlled air suspension system as fitted to a four wheel, four wheel drive vehicle comprises the following major components.

Figure 1:
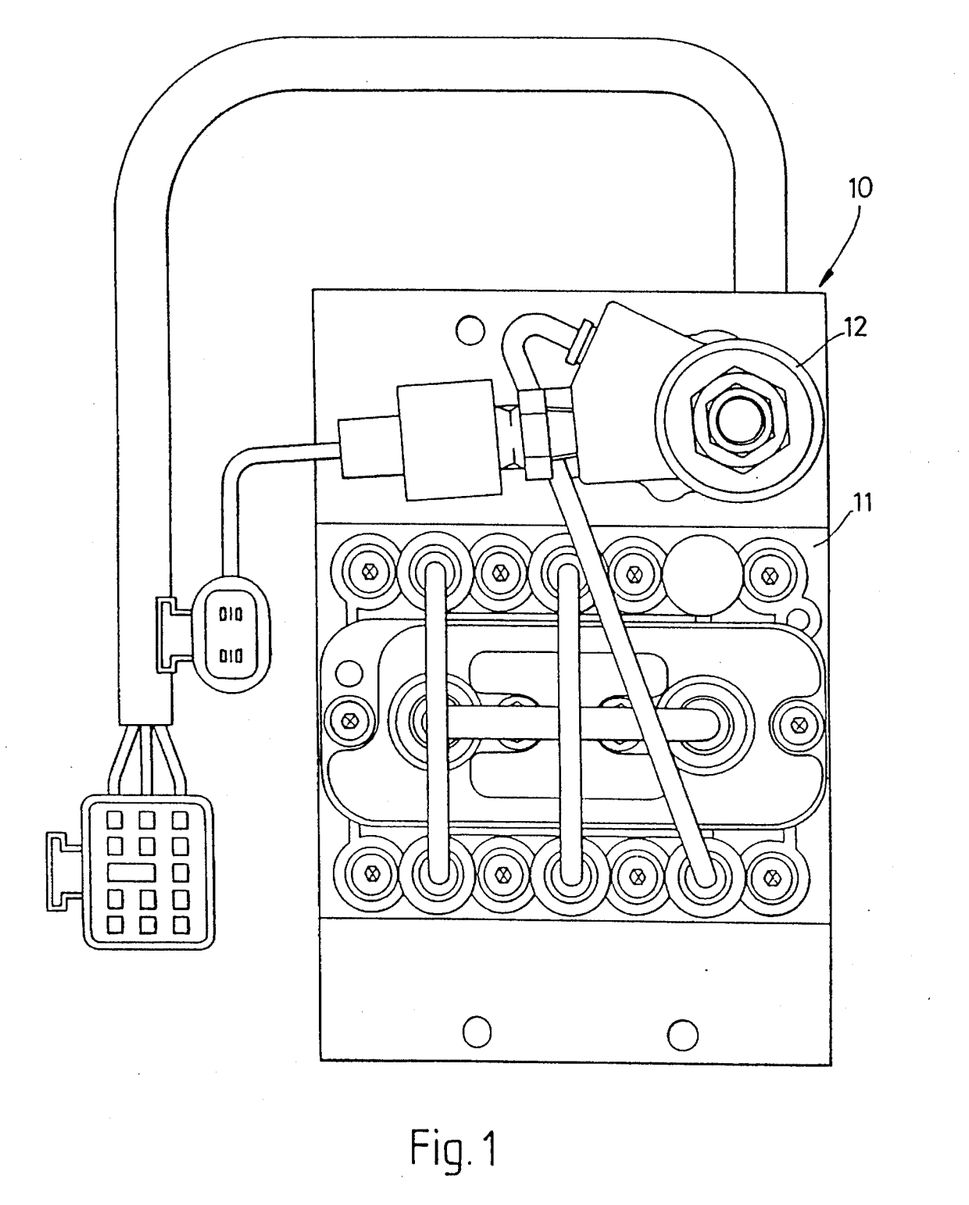
FIG. 1 which is a plan view of part of a system in accordance with the present invention.
Figure 2:
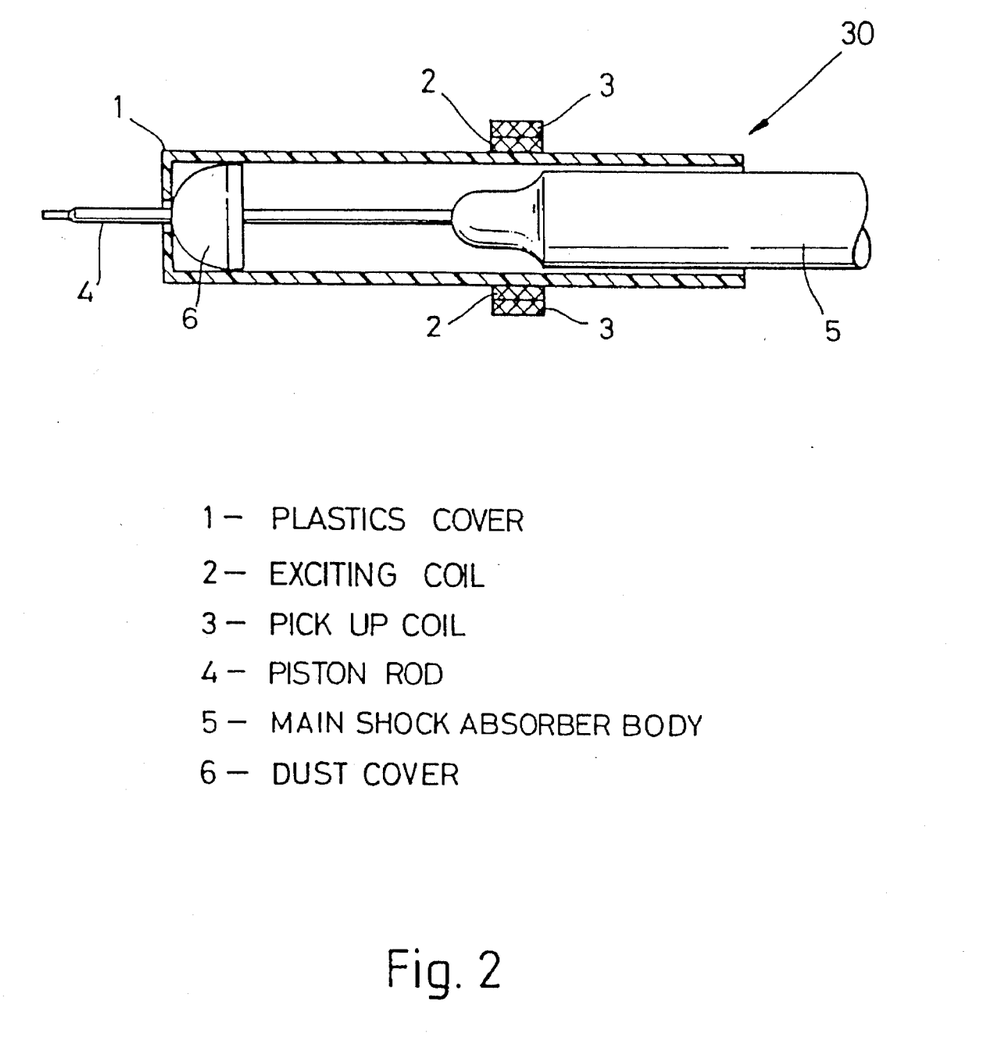
FIG. 2 which is a section view of a damper/height sensor unit.

Front Air Spring Assembly
Rear Air Spring Assembly
Electronic Control Unit
Reservoir Assembly
Air Harness
Mounting Bracket and Ancilliary Equipment, comprising:
 (i) Air Supply System comprising:
  Mounting Brackets
  Compressor Assembly
  Air Dryer Assembly
  Isolation Mounts
 (ii) Assembly 10—Valve Block & Air (see FIG. 1)
  Service Unit comprising:
   Solenoid Operated Air Distribution Valve Block 11
   Air Service Unit 12 incorporating:
    Non return Valve
    Pressure Switch
    Filter
    Schrader Connection
    Air Pipe Connector
Damper—Height Sensor Assembly ( see FIG. 2 )
Driver Operated Functional Switches The suspension spring media is provided by four air springs which replace the conventional coil springs.

The air springs provide a variable rate spring which achieve near constant ride frequency for all load conditions. Thus a significant improvement in overall ride is attainable.

The high pressure (13 bar) compressed air is provided by a 12V D.C. wobble piston Compressor which incorporates life of the vehicle brushes, radio frequency interference suppression and thermal trip protection.

To reduce air induction noise and protect the compressor cylinder bore, a serviceable air intake silencer/filter is fitted.

Figure 3:
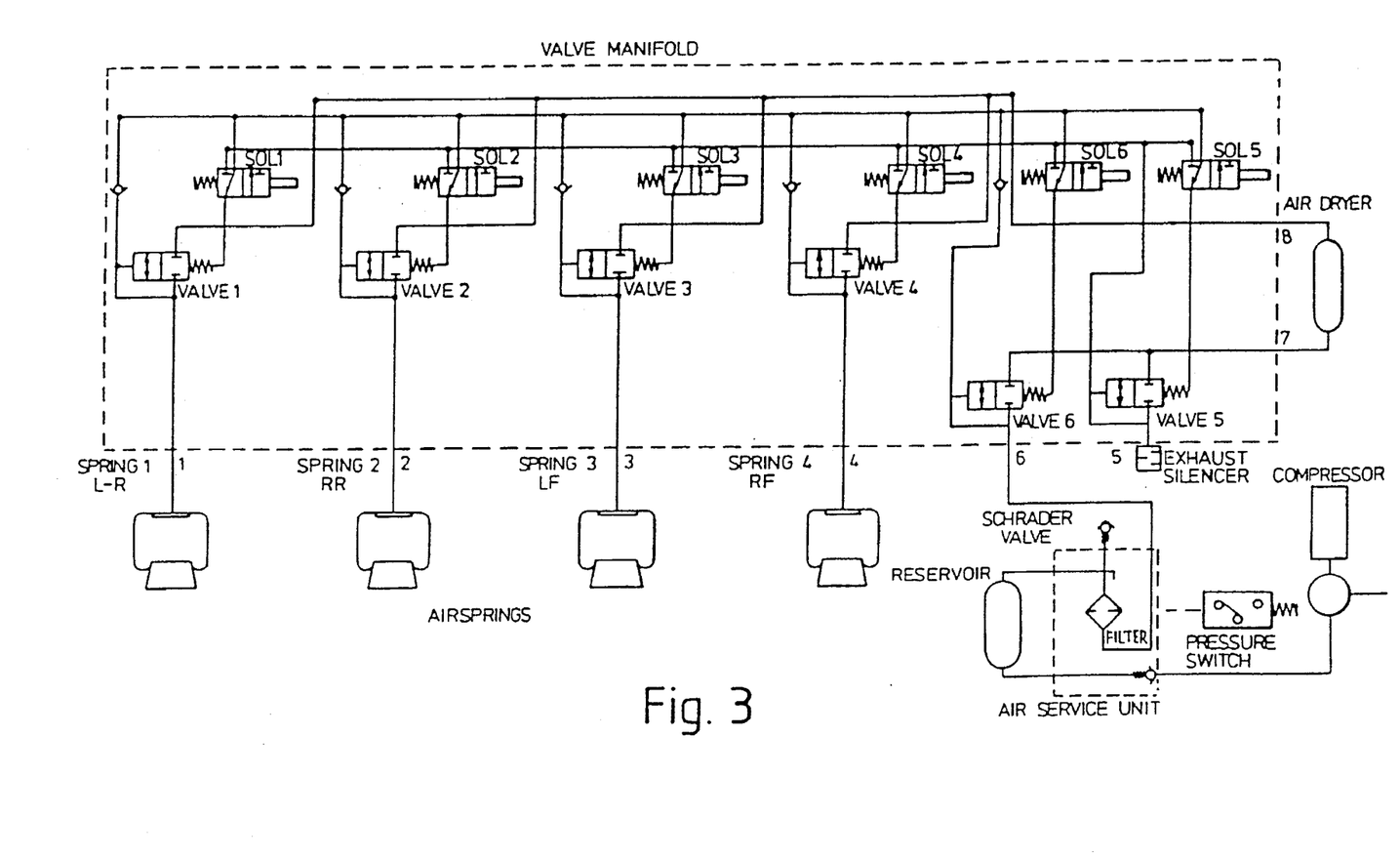
FIG. 3 which is a schematic of a spring control system.

The compressed air passes through a oneway valve (incorporated into the air service unit), to a 5L Reservoir which stores air at a nominal 13 bar pressure (see FIG. 3).

The reservoir, in addition, acts as a drop tank for the moisture that the compressed air will contain. Consequently, the reservoir must be drained periodically using the drain plug provided.

The compressed air is taken from the reservoir to the Air Service Unit which has a replaceble main air filter and a pressure switch. The purpose of the Pressure Switch is to maintain the system pressure between set limits by switching the compressor on and off via an E.C.U. controlled relay.

Air is then passed to the solenoid (six) operated air distribution valve block. The purpose of the valve block is to control the flow of air to, and from, the four air springs dependent upon system demands as determined by the inputs to the E.C.U..

Air flow to, and from, the air springs is controlled via pilot (air) operated high flow diaphragm valves. The pilot air is controlled by the six solenoid operated valves.

The pilot air line incorporates non-return valves in order to prevent loss of pilot pressure, and therefore air spring pressure, if there is a total loss of reservoir pressure.

For air to be admitted to any air spring the main air feed solenoid valve must be energized in addition to the relevant air spring solenoid or solenoids.

Conversely, for air to be exhausted from any spring the exhaust solenoid valve must be energized in addition to the relevant air spring solenoid or solenoids.

A silencer is fitted to the exhaust port of the valve block.

Air is passed through a dryer prior to being fed through the high flow diaphragm valves and into the air springs.

Conversely, air exhausted from the air springs passes through the dryer in the reverse direction prior to exhaust to atmosphere via the exhaust valve.

Moisture is removed from the air as it passes vertically upwards through the dryer dessicant. The dessicant in the lower portion of the dryer becomes 'wet'.

During exhaust the dry air from the air springs passes vertically downwards through the 'wet' dessicant absorbing moisture prior to venting to atmosphere.

This purging action regenerates the air dryer.

As stated, the purpose of the system is to provide four height sensor modes. The height of the vehicle, relative to the axles, is provided by sensors incorporated in each damper.

A variable inductive height sensor is incorporated in the dust cover of each damper 30 (see FIG. 2) and provides a signal whose level is dependent upon damper displacement.

The suspension is controlled by an eight bit microprocessor Electronic Control Unit which operates in one of the several states shown below status chart. During each state the E.C.U. maintains the requested ride height by adjusting the volume of air in an air spring attached to each wheel.

The controller determines engine rotation by measurement of the period of a phase of the vehicle alternator. If this period is greater than a required value the engine shall be considered stopped and all suspension functions will be inhibited except that level vehicle on parking mode.

This is to prevent the compressor drawing a large current from the battery when the alternator is not charging.

The controller calculates a value of vehicle speed by measuring the period between pulses from a speed sensor. The value is used to determine an allowable transition from one suspension state to another.

The controller adjusts the height of each suspension unit in accordance with the demanded state.

To raise the height the appropriate air spring valves are selected together with the main air feed inlet valve. To lower the height the appropriate air spring valves are selected with the exhaust valve.

When raising the height, the rear of the vehicle shall be raised first by approximately 70% of the required height change followed by raising the front to 70% of the required change. The remaining 30% change will be achieved by individual adjustment of each suspension unit.

Lowering of the vehicle will be complimentary to raising, with the front of the vehicle being lowered first.

This will ensure that when the headlamps are illuminated there is no inconvenience to other road users.

However, when lowering to the kneel position all air valves are opened at the same time to achieve a fast response.

The E.C.U. accepts switch inputs for the following functions:

Handbrake

Footbrake

Door Switch (open/closed) except tailgate

Reservoir pressure

Up

Down

Inhibit

The handbrake switch is used to control the kneel demand. Kneel cannot be entered unless: vehicle speed is zero, all doors closed, engine running and HANDBRAKE APPLIED.

Door (except tailgate) switch (open/closed) is used to control kneel demand. Kneel cannot be entered unless: vehicle speed is zero, ALL DOORS CLOSED, engine running and handbrake applied.

When the FOOTBRAKE is on, and for a period of one second after it is off, all height levelling is suspended.

The purpose of this inhibit is to prevent the system reacting to transient suspension movement caused by weight transfer during braking.

This inhibit function is removed after a period of 80 seconds regardless of footbrake state.

When the E.C.U. detects an output from the PRESSURE SWITCH indicating low pressure, then the E.C.U. operates the pump relay until the pressure switch indicates normal pressure. The pump relay will not operate unless the engine speed is greater than 500 r.p.m..

Figure 4:
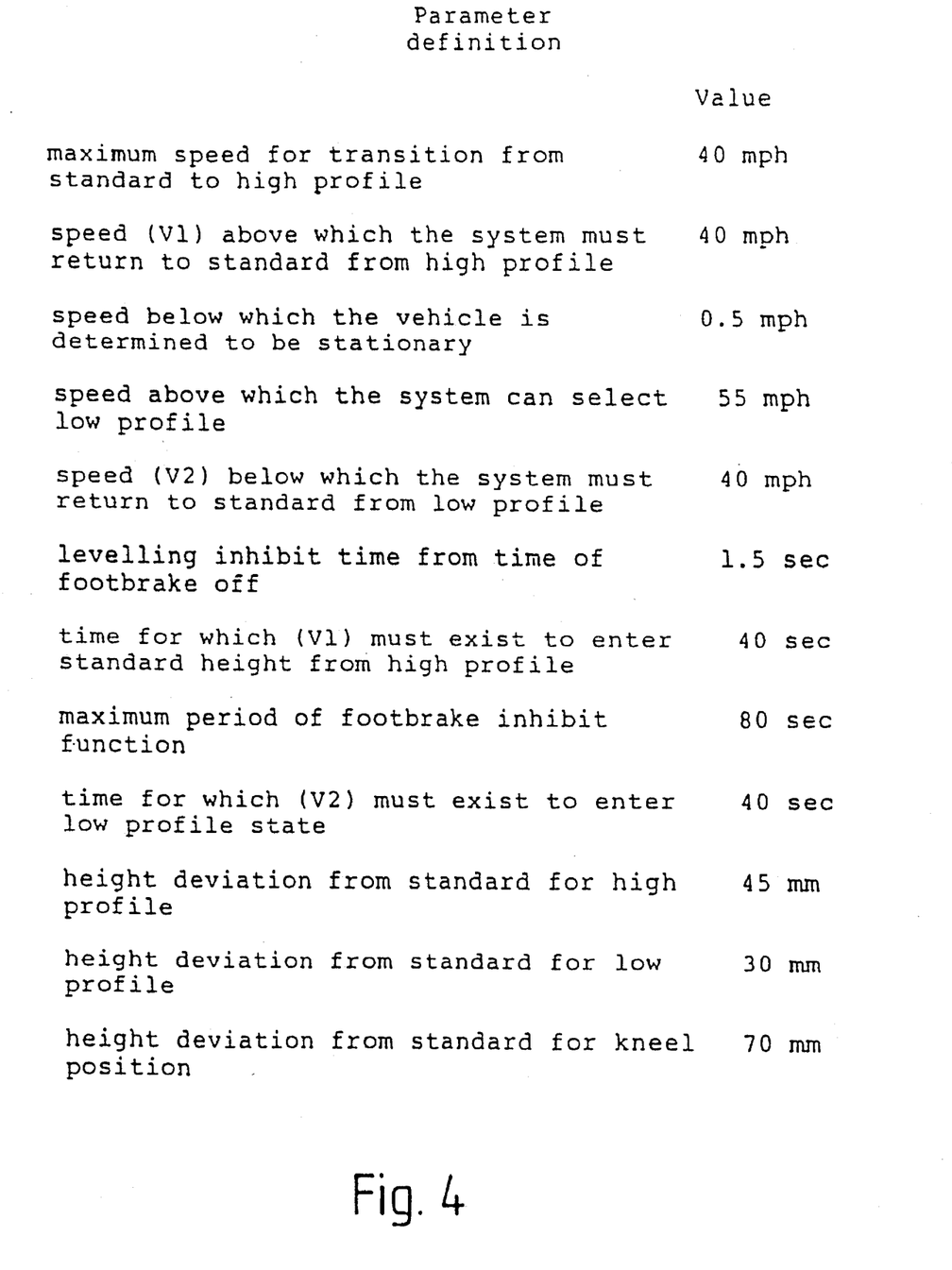
FIG. 4 which shows examples of typical system parameters.

The HIGH PROFILE ride state is driver selected by depressing the momentary UP switch. High profile raises the vehicle body by approximately 45 mm at road speeds below 40 m.p.h.. If road speed exceeds this figure the E.C.U. automatically reverts to standard ride height. High profile then has to be re-selected, if required, and is dependent upon conditional requirements (see FIG. 4).

Lowering the vehicle from high profile to standard ride height is achieved by depressing the momentary down switch twice.

The above are dependent upon fulfilment of all conditional requirements.

The self latching inhibit switch is engaged to maintain the suspension at the standard ride height. That is, automatic height adjustment and the up and down momentary switches are inoperative (inhibited). This should be engaged when towing.

Note that engaging the inhibit switch will automatically return the vehicle to standard ride height from any other height mode.

General freeze state is entered at any time on the E.C.U. detecting a passenger door opening. All height control is suspended in this state with all height control valves closed.

The E.C.U. will maintain the system in this state until the criterion for entering any state are met.

The freeze state is intended as a SAFETY factor and thus should not be artificially overriden.

A levelling mode on parking is incorporated into the E.C.U. functionality wherein the vehicle will continue to level to the lowest corner, for approximately 10 seconds, after the vehicle is exited and all doors closed.

The Electronic Control Unit incorporates Fault Recovery Strategies to minimise the effect of a sensor, or actuator failure.

A serial data link is provided to allow diagnostics information to be displayed and to set height sensor datums at the end of vehicle build or service.

Figure 5:
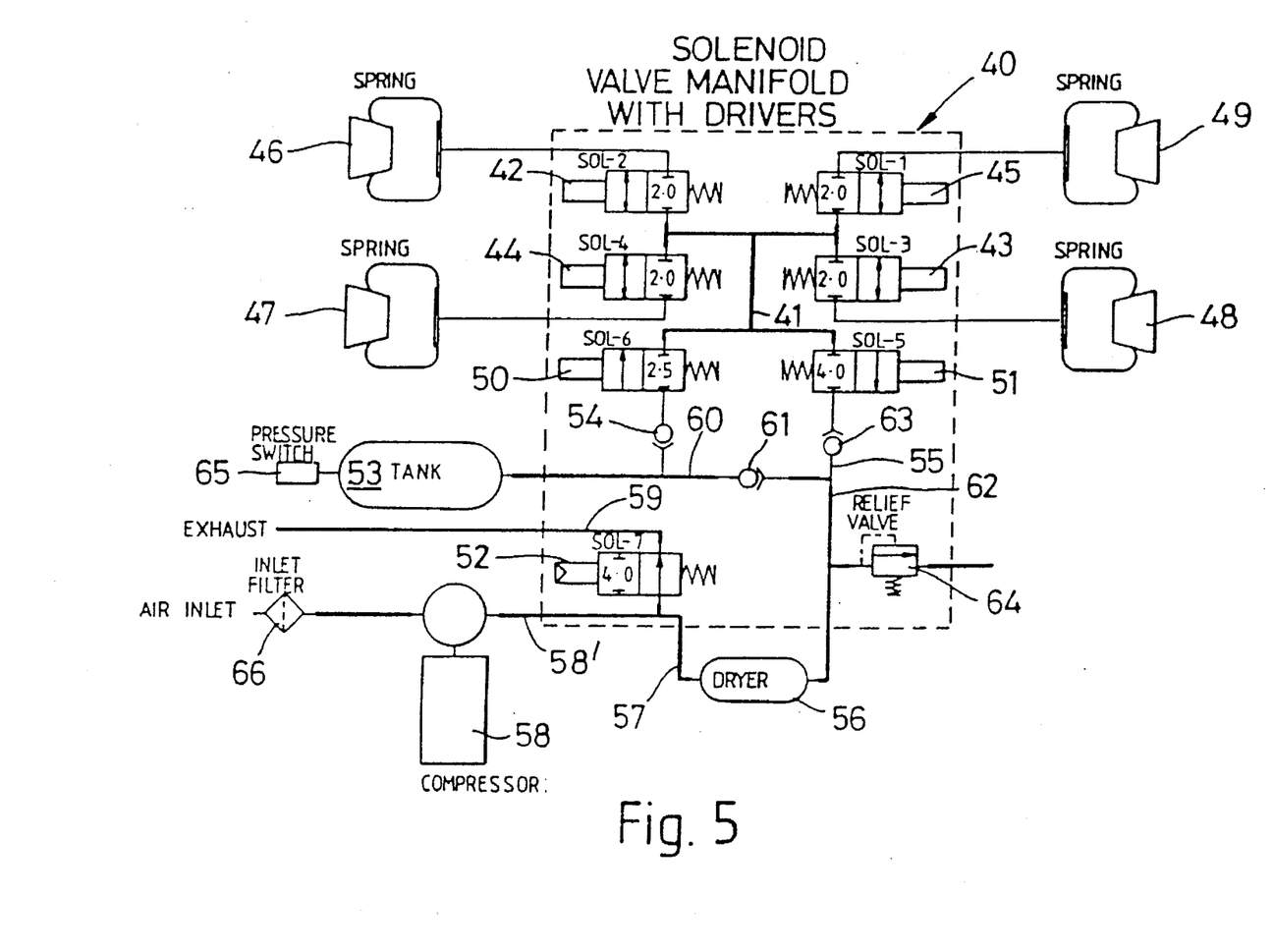
FIG. 5 which shows schematically a pneumatic suspension unit in accordance with the present invention.

The valve means of FIG. 5 comprises a valve manifold unit 40 having a central manifold chamber and four direct acting electrically operated solenoid valves 42–45 selectively controllable to allow pressurised air to be admitted to a respective air spring 46–49 or exhausted therefrom.

The manifold also incorporates three other electrically operated solenoid valves 50–52. One valve is a supply valve to allow pressurised air to be admitted to the chamber 41 from an external reservoir via a non-return valve 54. Another valve 51 is a first exhaust valve and interconnects with a second exhaust valve 52 via a first common flow path 55, an externally mounted regenerative drier 56 and a second common flow path 57.

An externally located compressor 58 connects via passage 58' with the second common flow path 57. The valve manifold also incorporates an exhaust passage 59 from the valve 52, an auxiliary supply passage 60 having a one-way valve 61 and interconnecting the reservoir 53 with a supply passage part 62 of the first common flow passage 55, and a non return valve 63 in that other part of the passage 55 between the supply part 62 and the first exhaust valve 51.

The valve means also incorporates other conventional items such as a safety relief valve 64, pressure switch 65 to initiate operation of the compressor 58 and air inlet filter 66.

In the aforedescribed apparatus the pressure in chamber 41 is controlled by operation of the valves 50,51 and is selected in accordance with the instantaneous requirements of a particular spring 46–49 which is put in communication with the chamber via 49 a respective valve 42–45.

When the reservoir pressure falls below a predetermined level and valves 51 and 52 are not in an exhaust mode the compressor 58 supplies filtered air to the reservoir 53 via the second common flow 57, drier 56, supply passage 62, non-return valve 61 and line 60.

When it is required to exhaust the chamber 41 any operation of the compressor is inhibited and the exhaust valves 51,52 are opened to allow air to flow via passage 55 and non-return valve 63 to pass regeneratively through drier 56 and then passage 57 and valve 52 to the exhaust line 59.

Figure 6:
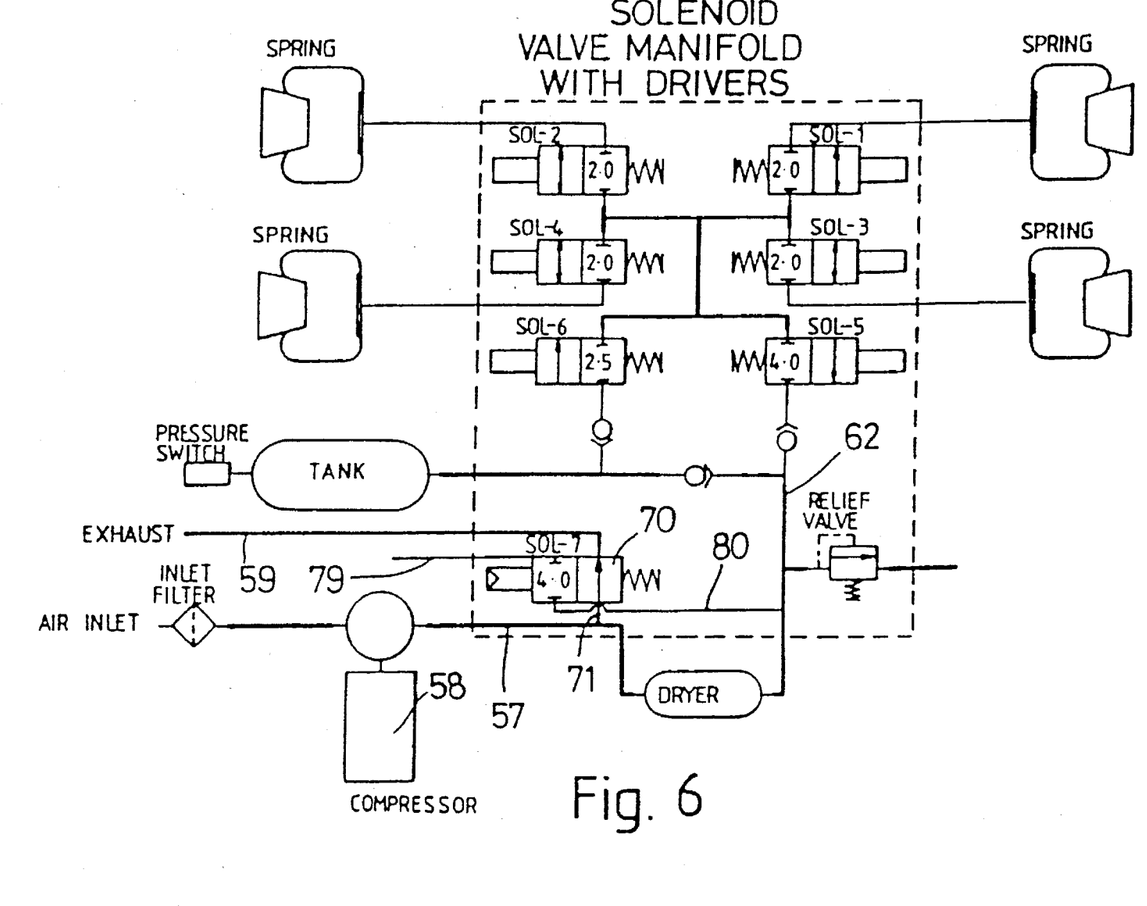
FIG. 6 shows a modified form of the embodiment of FIG. 5.
Figure 7:
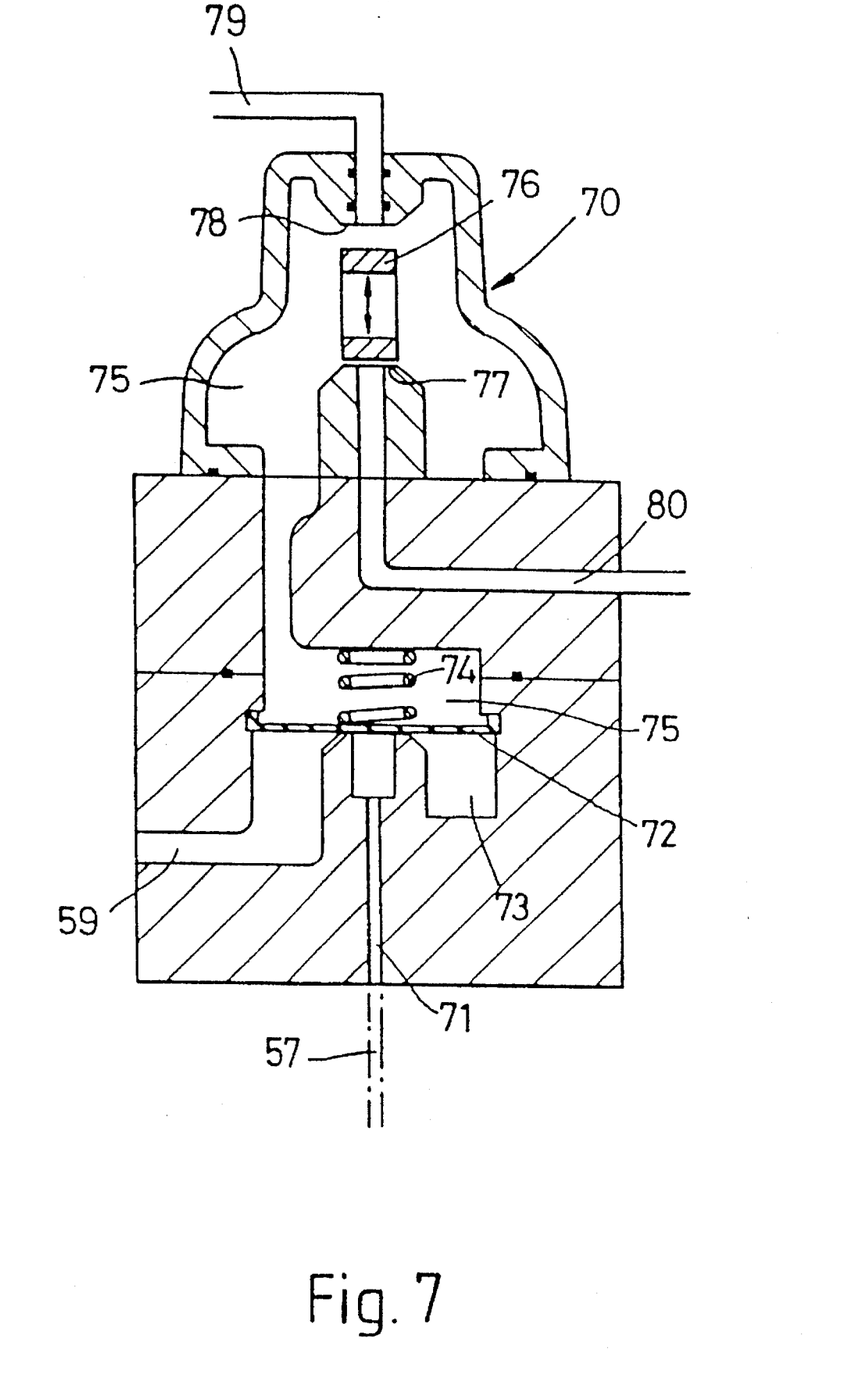
FIG. 7 is a cross-sectional view of a second, cushion exhaust valve of the suspension of FIG. 6.

The embodiment of FIG. 5 may be modified by replacing the second exhaust valve 52 with a pilot operated type valve 70 as shown schematically in FIG. 6, and the valve as shown in cross-section in FIG. 7. Parts common with FIG. 5 bear corresponding reference numerals.

The valve 70 has a main exhaust path via passage 71, which leads from passage 57 and over a first face of a valve diaphragm 72 to an exhaust plenum 73 connected to the exhaust line 59.

The valve diaphragm 72 is biased closed against passage 71 by a compression spring 74 and its face opposite the first face is acted on also by pressure of gas in the pilot chamber 75. The pressure in the pilot chamber is under the control of an electrically actuated solenoid valve plunger 76. When plunger 76 is against a first valve seat 77 as shown in FIG. 7 the second valve seat 78 is open and a pilot exhaust line 79 results in the pilot chamber 75 being at atmospheric pressure. When the plunger 76 lies against the seat 78 the chamber is exposed to the pressure in the first common flow path 62 with which it interconnects via a pilot feed line 80.

In use of the valve of FIG. 7, as incorporated in the valve means of FIG. 5 in place of the second exhaust valve 52, during normal exhaust modes the plunger 76 is seated against seat 77 so that exhaust occurs only via the drier and passage 71, thereby obtaining regenerative drying of the drier by all of the exhausting gas. In this position chamber 75 is open to atmosphere and gas exhausting via passage 71 is able to counter the effect of bias spring 74 and thereby lift the diaphragm from the seat of passage 71.

In the case of the compressor being called upon to supply pressurized air to the reservoir the solenoid of valve plunger 76 is operated to lift the plunger from seat 77 to bear against seat 78, thus closing chamber 75 from the pilot exhaust line. The pressure in chamber 75 will thus be that in line 62 which is at or substantially equal to atmospheric pressure because of the presence of the reservoir's one-way valve 61 and the facility for line 62 to exhaust via passsage 71 when the compressor is not operational. Hence on initial start up of the compressor 58 the pressure in line 57 is at or substantially equal to atmospheric pressure. The compressor is not required to suffer the strain and wear associated with start up against a significant pressure head.

Upon initial start up some gas will tend to exhaust via passage 71 against the bias of spring 74, but progressive increase of pressure in line 62 will act via line 80 and chamber 75 to cause the diaphragm 72 to be closed, it being noted that the area of diaphragm 72 exposed to the pressure in chamber 75 is much greater than that area within the valve seat at the end of passage 71. Thus after a momentary initial start up period the line 71 is closed by action of the pressure built up in chamber 75 and the reservoir can be recharged.

I claim:

1. A vehicle suspension of variable sensitivity comprising in combination vehicle speed sensing means, suspension units associated with respective vehicle wheels and selectively controllable to vary the ride height of the vehicle, each suspension unit incorporating an electrical height sensing device responsive to departure of the ride height from a predetermined height datum which is a function of the vehicle speed and to provide a signal related thereto to control movement of at least one suspension unit, thereby to tend to move at least a part of the vehicle to said predetermined height datum and timer means whereby the movement of a suspension unit in response to a signal from a height sensing device is inhibited as a function of the magnitude of until a signal of at least a predetermined magnitude has persisted for at least a prescribed part of a prescribed period of time.

2. A vehicle suspension according to claim 1 in which said suspension units are gas suspension units.

3. A vehicle suspension according to claim 1 comprising valve means responsive to signals from the height sensing device for selective control of gas to and from each suspension unit.

4. A vehicle which incorporates a suspension according to claim 1.

5. A vehicle suspension according to claim 1 in which the sensitivity variation is substantially continuously variable.

6. A vehicle suspension according to claim 1 in which the sensitivity variation varies in a stepped manner.

7. A vehicle suspension according to claim 1 having a sensitive mode during which the vehicle speedily adopts approximately the desired ride height and an insensitive mode in which the vehicle is more accurately positioned to a prescribed ride height.

8. A vehicle suspension according to claim 1 comprising an electronic control unit to receive information from the height sensing device and having associated therewith timer means whereby the timer means initiates a timed period if a height error of greater than a preset limit occurs, the electronic control unit being arranged to cause a height adjustment of the vehicle if the height error persists for greater than the prescribed period of time to reset the timer means in the event of the direction of the height error changing during the initially set period of time.

9. A vehicle suspension according to claim 7 in which the timed period has two values dependent on whether operating in accordance with the sensitive or insensitive.

10. A vehicle suspension according to claim 1 including a manual override operable to change the preselected ride height.

11. A vehicle suspension according to claim 10 in which the vehicle suspension incorporates an electronic control unit arranged to inhibit operation of the manual override depending on the speed of the vehicle.

12. A vehicle suspension according to claim 10 in which the system incorporates an electronic control unit arranged to revert to automatic height control from a manual override condition in the event of change of the vehicle speed to a prescribed speed or speed range.

13. A vehicle suspension according to claim 11 characterised in that the electronic control unit is responsive to information indicating that the vehicle is coupled to a load for towing and does not counter a manual overide instruction to lock the suspension to a standard ride height when towing.

14. A vehicle suspension comprising in combination vehicle speed sensing means, suspension units associated with respective vehicle wheels and selectively controllable to vary the ride height of the vehicle, each suspension unit incorporating an electrical height sensing device responsive to departure of the ride height from a predetermined height datum which is a function of the vehicle speed and to provide a signal related thereto to control movement of at least one suspension unit, thereby to tend to move at least a part of the vehicle to said predetermined height datum, a manual override to change the preselected ride height comprising an electronic unit responsive to information indicating that the vehicle is coupled to a load for towing and does not counter a manual override instruction to lock the suspension to a standard ride height when towing;

timer means whereby the movement of a suspension unit in response to a signal from a height sensing device is inhibited until a signal of at least a predetermined magnitude has persisted for at least a prescribed part of a prescribed period of time.

* * * * *

UNITED STATES PATENT AND TRADEMARK OFFICE
CERTIFICATE OF CORRECTION

PATENT NO. : 5,466,007
DATED : November 14, 1995
INVENTOR(S) : Wilfred Ward SMITH It is certified that error appears in the above-indentified patent and that said Letters Patent is hereby corrected as shown below:

```
Column 8, line 11, change "of until a signal" to
         --of that signal until a said signal--.
```

Signed and Sealed this

Fourth Day of June, 1996

Attest:

BRUCE LEHMAN

Attesting Officer     Commissioner of Patents and Trademarks